United States Patent [19]  [11] Patent Number: 4,980,903
Messalti et al.  [45] Date of Patent: Dec. 25, 1990

[54] PHOTOGRAPHIC CASSETTE

[75] Inventors: Mansour Messalti; Bruce R. Muller, both of Rochester, N.Y.

[73] Assignee: Eastman Kodak Company, Rochester, N.Y.

[21] Appl. No.: 358,995

[22] Filed: May 30, 1989

[51] Int. Cl.⁵ ...................... G03B 42/04; G03B 42/02; A61B 6/14
[52] U.S. Cl. .................................. 378/182; 378/169; 378/173; 378/187
[58] Field of Search ............... 378/172, 173, 181, 182, 378/184, 187, 188, 167, 168, 169, 170, 171, 175, 177, 183, 185

[56] References Cited

U.S. PATENT DOCUMENTS

| 773,382 | 10/1904 | Folmer . | |
|---|---|---|---|
| 1,631,479 | 6/1927 | Folmer . | |
| 2,056,144 | 5/1936 | Roth | 95/67 |
| 4,444,484 | 4/1984 | Best et al. | 354/276 |
| 4,688,243 | 8/1987 | De Felice et al. | 378/187 |
| 4,763,346 | 8/1988 | Niedospial et al. | 378/187 |
| 4,813,063 | 3/1989 | Carmichael et al. | 378/182 |

Primary Examiner—Janice A. Howell
Assistant Examiner—Don Wong
Attorney, Agent, or Firm—G. Herman Childress

[57] ABSTRACT

A light shield for an x-ray film sheet cassette is provided with increased flexibility in its end portions to prevent bowing of the shield when it is subjected to abnormal forces in its center portion. This is accomplished by notching the front lip of the light shield in the end portions of the shield.

1 Claim, 8 Drawing Sheets

PHOTOGRAPHIC CASSETTE

BACKGROUND OF THE INVENTION

1. Field of the Invention

The present invention relates generally to photographic cassettes, and more particularly to an improved photographic cassette, such as an x-ray film sheet cassette.

2. Description of the Prior Art

U.S. Pat. No. 4,813,063 discloses a photographic cassette having one end wall provided with an entry slot through which a film sheet is moveable along an inlet path. The cassette is provided with an elongate rectangular light shield having a lip along a front edge thereof nestable in a groove to prevent light from entering the entry slot of the cassette. The light shield has a shoulder at each end extending into a channel and into the path of a ramp, and a leaf spring extending from each shoulder rearwardly of the front edge onto a support member for biasing the lip into light-tight engagement with the groove.

When a cassette of the type described above is subjected to an external force to its weight-bearing front cover wall, such as the force produced by a portion of a patients anatomy, the cover and intersifter screen become bowed. Also, the light shield becomes bowed resulting in some cases light leakage progressively outward from the center of the shield toward its ends. It is an object of the present invention to provide the light shield with more flexibility toward its ends to prevent such light leakage when the cassette is subjected to such abnormal forces.

SUMMARY OF THE INVENTION

In accordance with the invention, a light shield is provided with increased flexibility in its end portions to prevent bowing of the shield when it is subjected to abnormal forces in its center portion. In a preferred embodiment, this is accomplished by notching the front lip of the light shield to provide such increased flexibility.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENT

Because certain parts of photographic cassettes and related apparatus are well known, the following description is directed in particular to those elements forming, cooperating directly with, or relating to the present invention. Elements not specifically shown or described herein are selectable from those known in the art, particularly as shown in U.S. Pat. No. 4,813,063 the disclosure of which is incorporated herein by reference.

Figure 1:
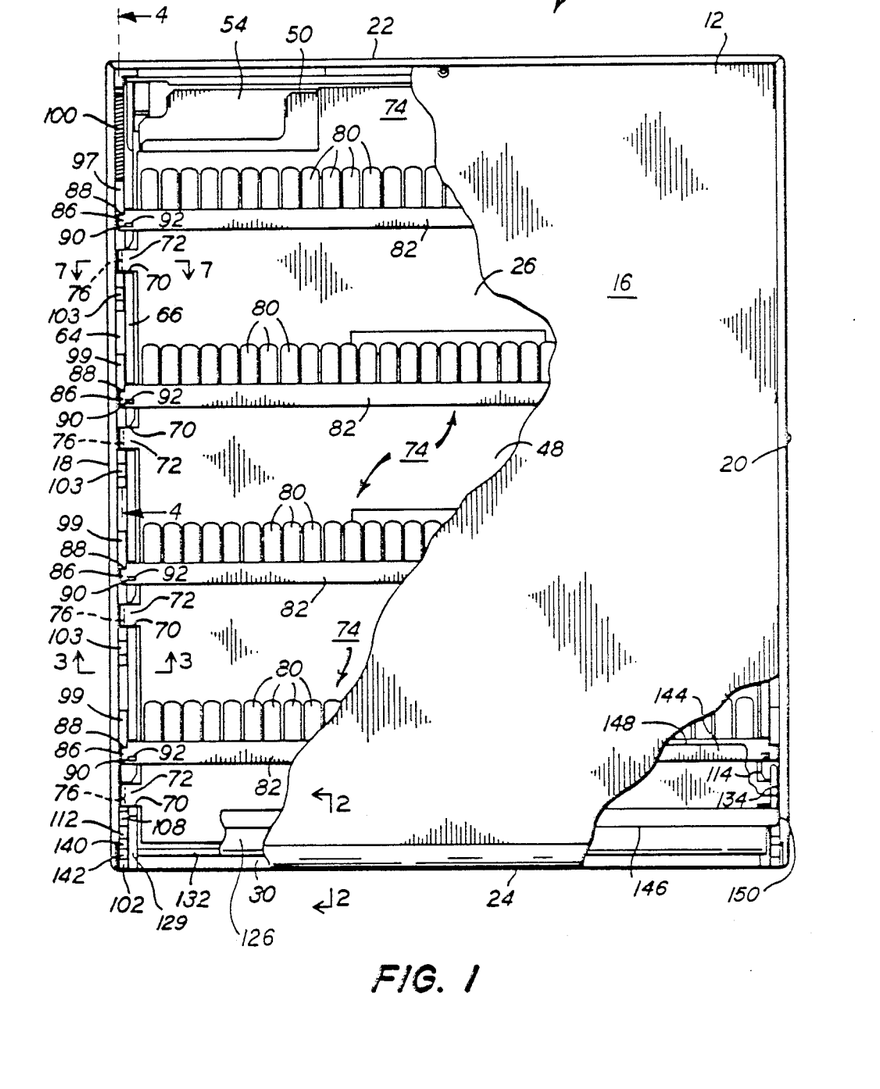
FIG. 1 is a top-plan view, with portions thereof broken away, of a photographic cassette constructed in accordance with a preferred embodiment of the present invention.
Figure 2:
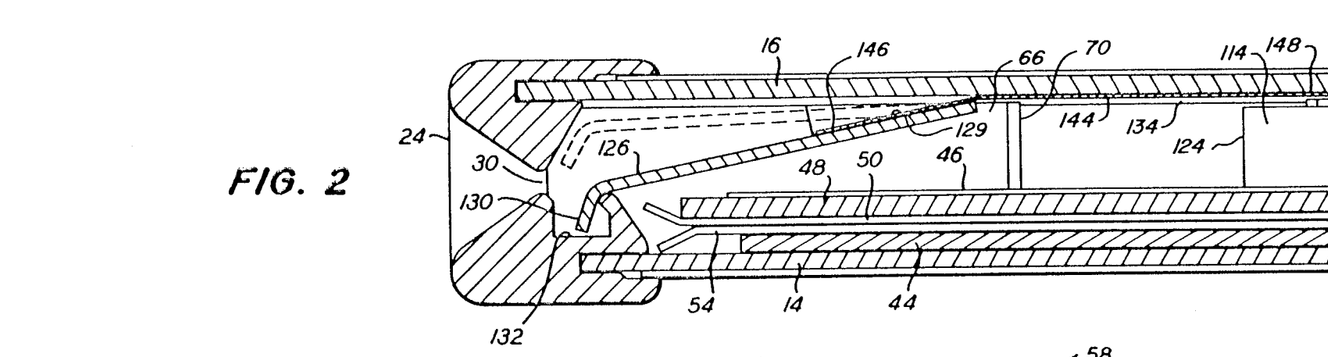
FIG. 2 is a segmental section view of the light-lock mechanism taken substantially along line 2—2 of FIG. 1.

Illustrated in FIGS. 1 and 2 is a photographic cassette 10 designed to hold a film sheet F (FIG. 7) for exposure when positioned in operative relation to a source of x-ray radiation. The cassette includes a rectangular-solid-shaped housing 12 defined by six opaque walls 14, 16, 18, 20, 22 and 24 which are joined as shown to enclose a chamber 26 for accommodating the film sheet. Opposing front and rear cover walls 14, 16 are spaced from and parallel with each other so that when the cassette is oriented for an exposure, front or tube cover wall 14 faces the radiation source and rear cover wall 16 lies behind the film sheet. Joined to front and rear cover walls 14, 16 are opposing side walls 18, 20 and opposing end walls 22, 24. End wall 24 has a light-shielded elongate opening or slot 30 therein through which the film sheet can pass along a film path 32 into and out of chamber 26.

Located inside housing chamber 26, between and substantially parallel with front and rear cover walls 14, 16 is a pressure plate 48 made of magnesium or aluminum and mounted for movement toward and away from front cover wall 14. Secured to the front of pressure plate 48 is a sheet-like intensifier screen 50 (FIGS. 2 and 4) similar in size and shape to film sheet F and having a forward-facing, substantially planar surface 52. Coated onto the rear of plate 48 is a layer of lead foil 46. Loosely placed onto the inner surface of front cover wall 14 is a floating plate 44 onto which a similar screen 54 is secured having a rearward-facing, substantially planar surface 56. Front floating plate 44 may have the center portion thereof secured to the inner surface of front cover wall 14 since good film-to-screen contact occurs at the center of the cassette whether front cover wall 14 is bowed by pressure applying means or not. However, portions of the floating plate surface adjacent the inner surface of front cover wall 14 and progressing outwardly from the center of the cassette must be loose relative to the inner surface of front cover wall 14 so that end portions of screen 54 and floating plate 44 will remain in contact with the film when front cover wall 14 is bowed, and will not withdraw therefrom. Planar surfaces 52 and 56 of screens 50 and 54 respectively thus face toward each other, so as to face opposite surfaces of film sheet F, when the film sheet is operatively disposed between the two screens.

Figure 3:
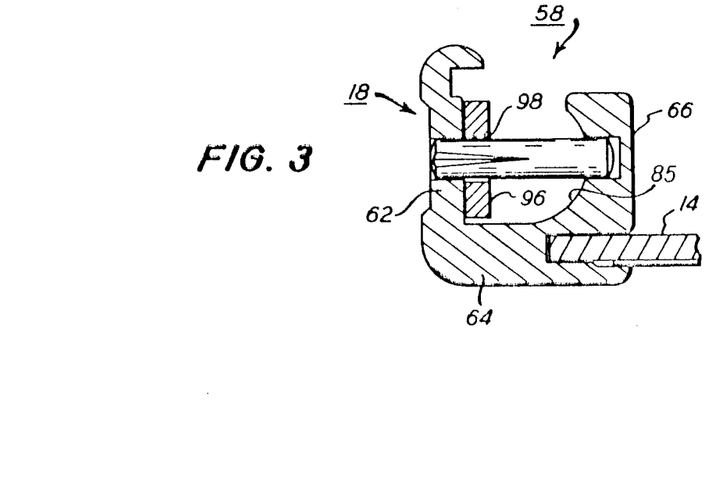
FIG. 3 is a section view taken substantially along line 3—3 of FIG. 1.
Figure 6:
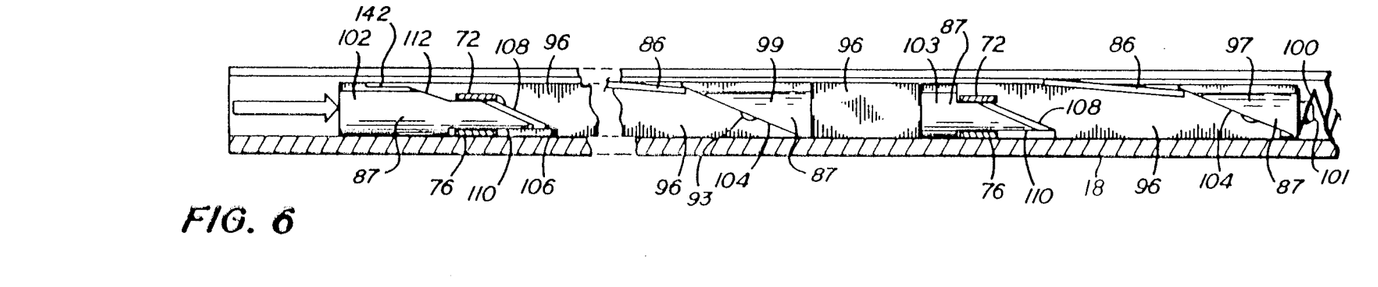
FIG. 6 is a view similar to FIGS. 4 and 5 showing the position of the push-bar mechanism in its fully extended position.
Figure 7:
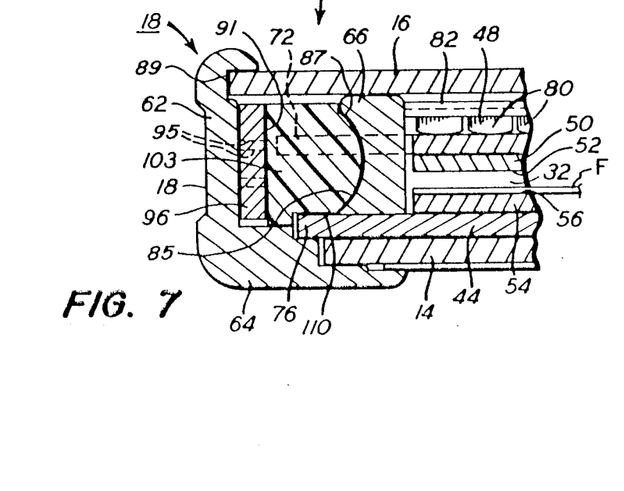
FIG. 7 is an enlarged segmental section view taken substantially along line 7—7 of FIG. 1 with the push-bar mechanism in its extended position.
Figure 8:
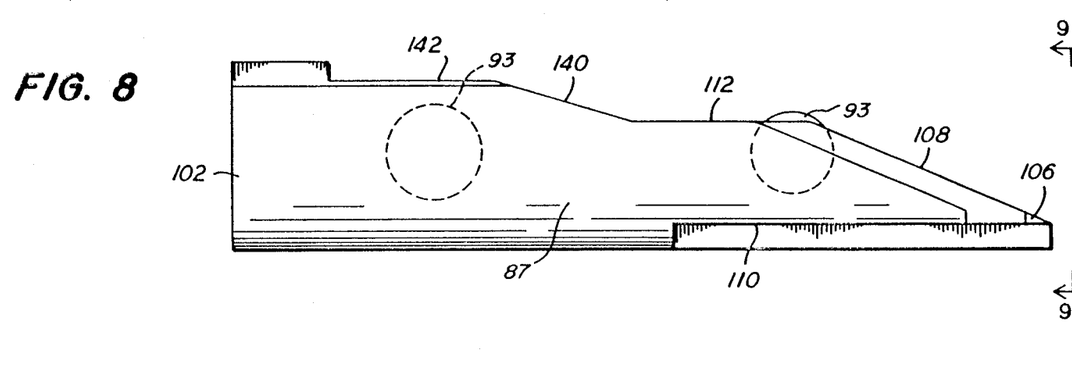
FIG. 8 is a side elevational view of a push-button ramp.
Figure 9:
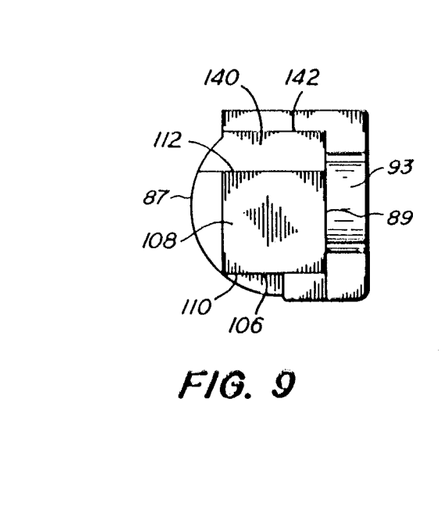
FIG. 9 is an end view of the push-button ramp of FIG. 8.
Figures 10, 11:
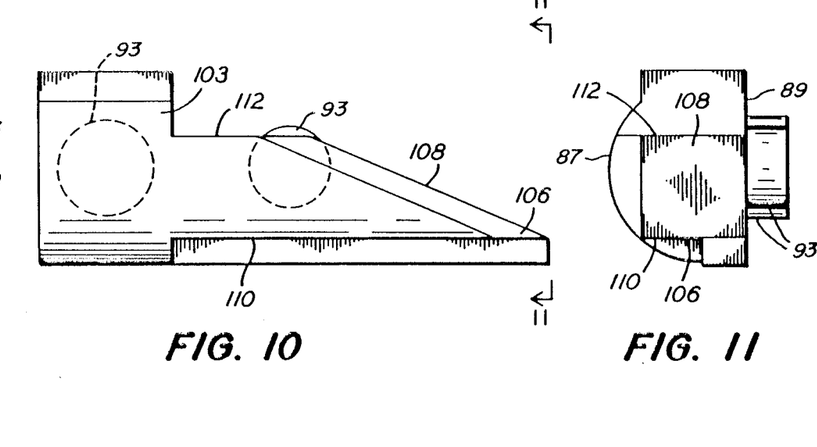
FIG. 10 is a side elevational view of a ramp.
FIG. 11 is an end view of the ramp of FIG. 10.
Figure 12:
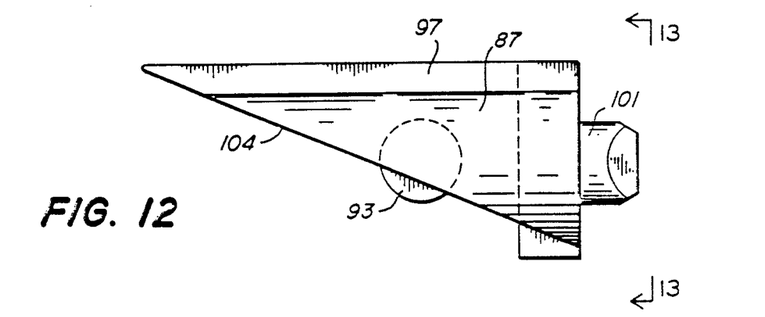
FIG. 12 is a side elevational view of a wedge end.
Figure 13:
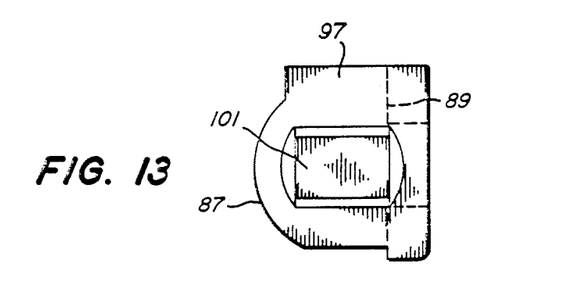
FIG. 13 is an end view of the wedge end of FIG. 12.
Figures 14, 15:
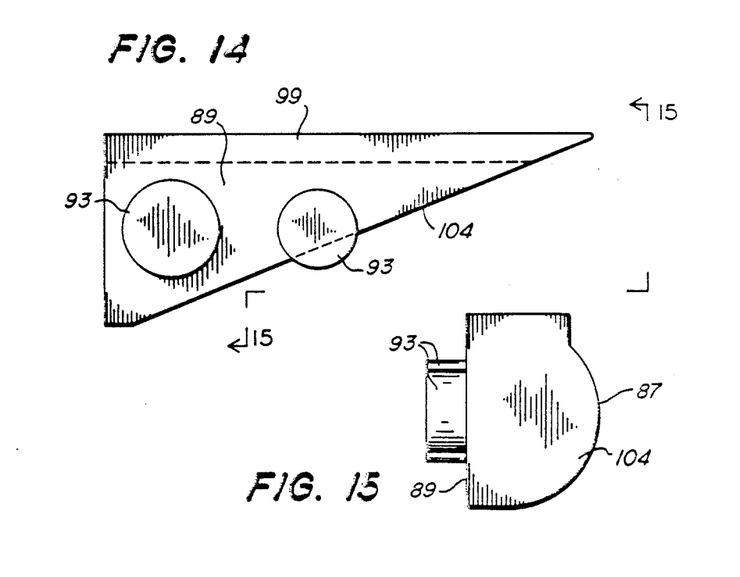
FIG. 14 is a side elevational view of a wedge.
FIG. 15 is an end view of the wedge of FIG. 14.

As shown in FIGS. 3 and 7, a channel 58 is provided on housing side wall 18 and extends longitudinally from a closed end at wall 22 to an open end at wall 24. A similar channel (not shown) is provided in wall 20. Although the following description refers only to features of and parts associated with channel 58, it will be understood that the same description applies to corresponding features of and parts associated with the channel on the opposite side wall 20, which is a mirror image of channel 58. Channel 58 may be viewed as bounded on three sides by outer, medial, and inner sections 62, 64, 66 respectively of side wall 18. Spaced along inner section 66 are four rectangular cut-outs 70 (FIG. 1) opening toward rear wall 16. Cut-outs 70 are positioned and dimensioned to receive, loosely, complementary tabs 72 extending laterally from pressure plate 48, so as to locate plate 48 and screen 50 in registration with screen 54, and also guide movement of pressure plate 48 and screen 50 toward and away from screen 54 as the tabs ride forward and rearward, respectively, in the cut-outs. At least the two outer cut-outs further loosely receive complementary ears 76 (FIGS. 1 and 4-6) laterally extending from side edges of floating plate 44.

Biasing pressure plate 48 forwardly, that is, toward front cover wall 14, is a plurality of spring assemblies 74 mounted between plate 48 and rear cover wall 16. Each spring assembly comprises a plurality of leaf springs 80 projecting longitudinally toward end wall 22 from a connecting bar 82 which extends transversely from side wall 18 to side wall 20. The laterally extending end portions 86 of bar 82 are loosely received by a cut-out 88 (FIG. 1) provided in inner section 66, and is located therein by a small projection 90 on section 66 protruding rearwardly through a mating aperture 92 in end portion 86, forming a pivot for the spring assembly. End portion 86 terminates in a rocker arm 94 which lies perpendicular to rod bar 82 and projects longitudinally toward end wall 22 in registration with medial section 64. Means are provided in channels 58 for engaging and rocking rocker arms 94, and with it the spring assemblies about projections 90, so as to increase the spring force biasing pressure plate 48 toward front cover wall 14. Retraction of the engaging and rocking means from arms 94 decreases or releases the spring force so that pressure plate 48 can be retracted or moved rearwardly without any or little opposition thereto by the spring assemblies.

The above-mentioned rocking means for rocker arms 94 comprises an elongate push bar 96 mounted, by means, of a conventional pin-and-slot arrangement 98, (FIG. 1) for longitudinal sliding movement toward and away from end wall 24. To facilitate such movement with a minimum of friction and dirt generation, each channel is provided with an asymmetrical cross-section, by virtue of an arcuate inner surface 85 on inner section 66, as best seen in FIGS. 3 and 7. Wedges 97, 99 and ramps 102, 103 are mounted on push bar 96, and are each provided with arcuate side surfaces 87 that mate or nest in the arcuate inner surfaces 85 of inner section 66. The wedges and ramps are molded as unitary members out of a low friction material and the mating of the arcuate side and inner surfaces minimizes the frictional area between the slidable push bar 96, wedges and ramps and the stationary support channel.

The wedges 97, 99 and ramps 102, 103 are all mounted to push bar 96 by means of flat surfaces 89 thereon that abut a side surface 91 of push bar 96. The wedges and ramps each further have a pair of round pins 93 laterally extending from flat surface 89 into complementary openings 95 (FIG. 7) in push bar 96. Although the wedges and ramps do not have to be rigidly secured to the push bar, securement by adhesive or the like is preferred to facilitate assembly of the push bar into the cassette.

Figure 4:
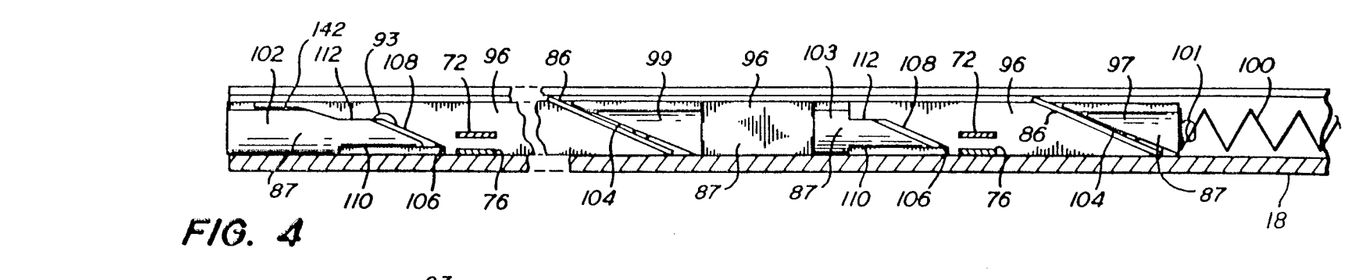
FIG. 4 is a segmental side elevational view taken substantially from line 4—4 of FIG. 1 with the push-bar mechanism in its normally retracted position.

Biasing bar 96 toward end wall 24 is a compression spring 100 disposed in channel 58 near end wall 22 and pushing against a post 101 at one end of end wedge 97, as seen in FIGS. 1 and 4. Fixed to the opposite end of the bar is a pushbutton ramp 102, one of two which normally lies in the open channel 58 flush with end wall 24. Bar 96 thus can be moved away from end wall 24, toward end wall 22, by pushing upon button 102 with enough force to overcome the opposing biasing influence of spring 100.

Interposed between end wedge 97 and pushbutton ramp 102 on bar 96 are a pair of spaced wedges 99 and a pair of spaced ramps 103. Each of the wedges 97, 99 has a slanted surface 104 facing the front cover wall. In the normal retracted position of bar 96, shown in FIGS. 1 and 4, wherein button 102 lies flush with end wall 24, slanted surfaces 104 engage arms 94 of the spring assemblies, thereby pivoting or rocking the spring assemblies clockwise about pivots 90 causing leaf springs 80 to be tensioned so as to increase the spring force biasing plate 48 toward front cover wall 14. When buttons 102 are depressed so as to move bars 96 to their extended positions, shown in FIG. 6, slanted surfaces are moved free or retracted from arms 94 allowing leaf springs 80 to return to their untensioned conditions so that little, if any, spring force is biasing pressure plate 48 toward front cover wall 14.

Figure 5:
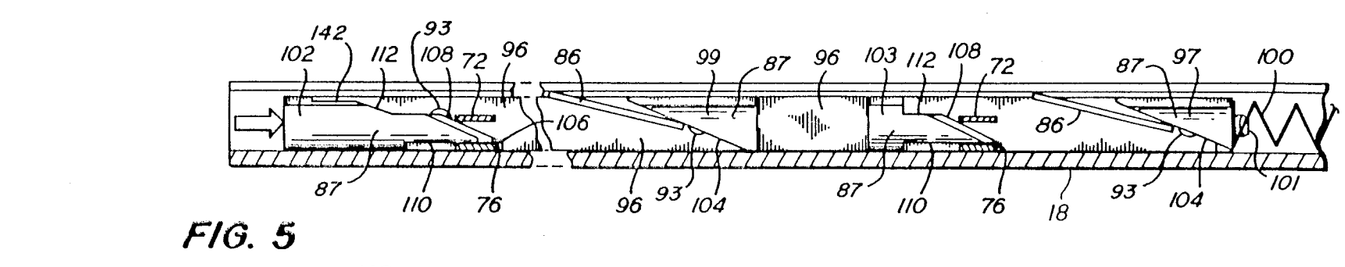
FIG. 5 is a view similar to FIG. 4 showing the push-bar mechanism partially moved toward its extended position.

Each of the ramps 102, 103, as seen in FIGS. 4-6 and 8-11, are provided with a sharp end 106 having an inclined surface 108 facing rear cover wall 16 and a flat recessed surface 110 facing the medial section 64. The inclined and flat surfaces 108, 110 respectively form a sharp acute angle. In the normal retracted position of bar 96, shown in FIGS. 1 and 4, wherein button 102 lies flush with end wall 24, the sharp ends 106 of ramps 102, 103 are positioned on one side of the spaced and registering tabs 72 and ears 76. When button 102 is depressed so as to move bar 96 partially toward its extended position, as shown in FIG. 5, initial movement of bar 96 causes flat surfaces 110 of the ramps to move over ears 76 for latching the loose portions of floating plate 44 to front cover wall 14, and inclined surfaces 108 of the ramps to cam tabs 72 and pressure plate 48 toward rear cover wall 16. In the fully extended position of bar 96, shown in FIG. 6, tabs 72 rest on flat surfaces 112 on ramps 102, 103, in which position pressure plate 48 and floating plate 44 are spaced apart (see FIG. 7) to form an inlet space or film path 32 along which a film sheet can slide between screen surfaces 50, 54 for loading or unloading the cassette. When the actuating force on buttons 102 are removed and bars 96 are returned by springs 100 to their normal retracted positions, the inclined and flat surfaces 108, 110 are moved out from between tabs 72 and ears 76 as the sharp ends 106 of the ramps are moved clear of the tabs and ears; that is, retracted therefrom.

Figure 16:
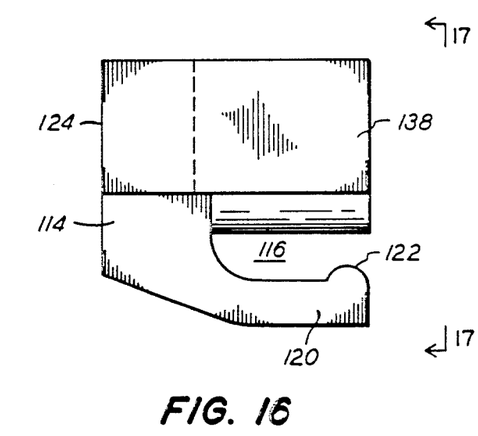
FIG. 16 is a top plan view of a wear block.
Figure 17:
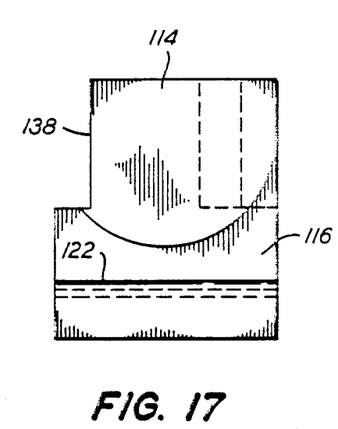
FIG. 17 is an end view of the wear block of FIG. 16.

With reference to FIGS. 16 and 17, a unitary wear block member 114 molded from a low friction material is mounted in each channel 58 for Precisely locating a pressure plate tab 72 extending through a cut-out 70 in the inner section 66 of the channel so that the remaining pressure plate tabs 72 are centered in complementary cut-outs 70 extending through the inner section. Accordingly, no rubbing exists between the remaining pressure plate tabs 72 and the edges of the complementary channel cut-outs 70 thereby eliminating the possibility of any dirt being generated therebetween. Each wear block member 114 is mounted within channel 58 (see FIGS. 1 and 2) by a slot 116 in the wear block member receiving a flange on inner section 66. The slot defines a finger 120 on wear block member 114 having an inner lip 122 engageable with a notch, not shown, on the inner section for releasably securing the wear block member to the inner section. An end surface 124 of wear block member 114 cooperates with an edge of a cut-out 70 on inner section 66 for precisely locating pressure plate tab 72 extending therethrough.

Referring again to FIGS. 1 and 2, near end wall 24 and extending parallel therewith from side wall 18 to side wall 20 is a light shield 126 configured and disposed to shield film sheet F from any light that might enter chamber 26 through slot 30. Shield 126 is rockably mounted between plate 48 and rear wall 16 with a tab 128 projecting laterally from each end thereof across medial section 64 (FIG. 3) of each side wall 18 and 20 and resting on an inclined shoulder 129 (FIG. 1) on inner section 66 (FIGS. 3 and 7). Shield 126 has a lip 130 which projects angularly and forwardly toward a groove 132 adjacent to slot 30. Secured to and projecting from the rear of each tab 128 (FIG. 18) is a leaf spring 134 having a free end portion 136 bearing resiliently upon a flat upper surface 138 (FIGS. 16 and 17) of wear block member 114. In the normal retracted position of bar 96, shown in FIGS. 1 and 4, leaf springs 80 urge pressure plate 48 toward screen 50 to hold the film sheet flat against screen 54 and floating plate 44. Also springs 134 and rear cover wall 16 keep shield 126 in its forward, light-shielding position shown in FIG. 2 wherein lip 130 is held in groove 132 so as to block passage of any light through slot 30. In this condition, the cassette is said to be closed. When bar 96 is moved to its extended position, as shown in FIG. 6, for separating the pressure and floating plates 48, 44 respectively, (FIG. 7) another inclined surface 140 terminating in a flat support surface 142 on push- button ramp 102 engages tabs 128 and pivotably cams light shield 126 rearwardly toward wall 16 against the biasing influence of springs 134. Shield 126 pivots upwardly about its rear edge and upper surface 138 until lip 130 has left groove 132 and has cleared slot 30, as seen dotted lines in FIG. 2, thereby allowing film sheet F to move into or out of the space between screens 50 and 54. In this condition, the cassette is said to be open.

Additional light sealing is provided, as seen in FIG. 1, by a thin flexible plastic opaque cape 144 of the same length as the light shield, and of a rectangular shape. One long edge 146 of cape 144 is secured to a rear edge of light shield 126 by adhesive or the like, and the opposite long edge 148 is free and rests on top of spring assembly bar 82. The short ends 150, only one of which is shown in part, extend to the outer sections 62 of channels 58 and over leaf springs 134. Accordingly, additional light sealing is obtained along the ends of the light shield 126, along the rear edge of the light shield, and along the contact line between the inner surface of rear cover wall 16 and spring assembly bar 82.

Figure 18:
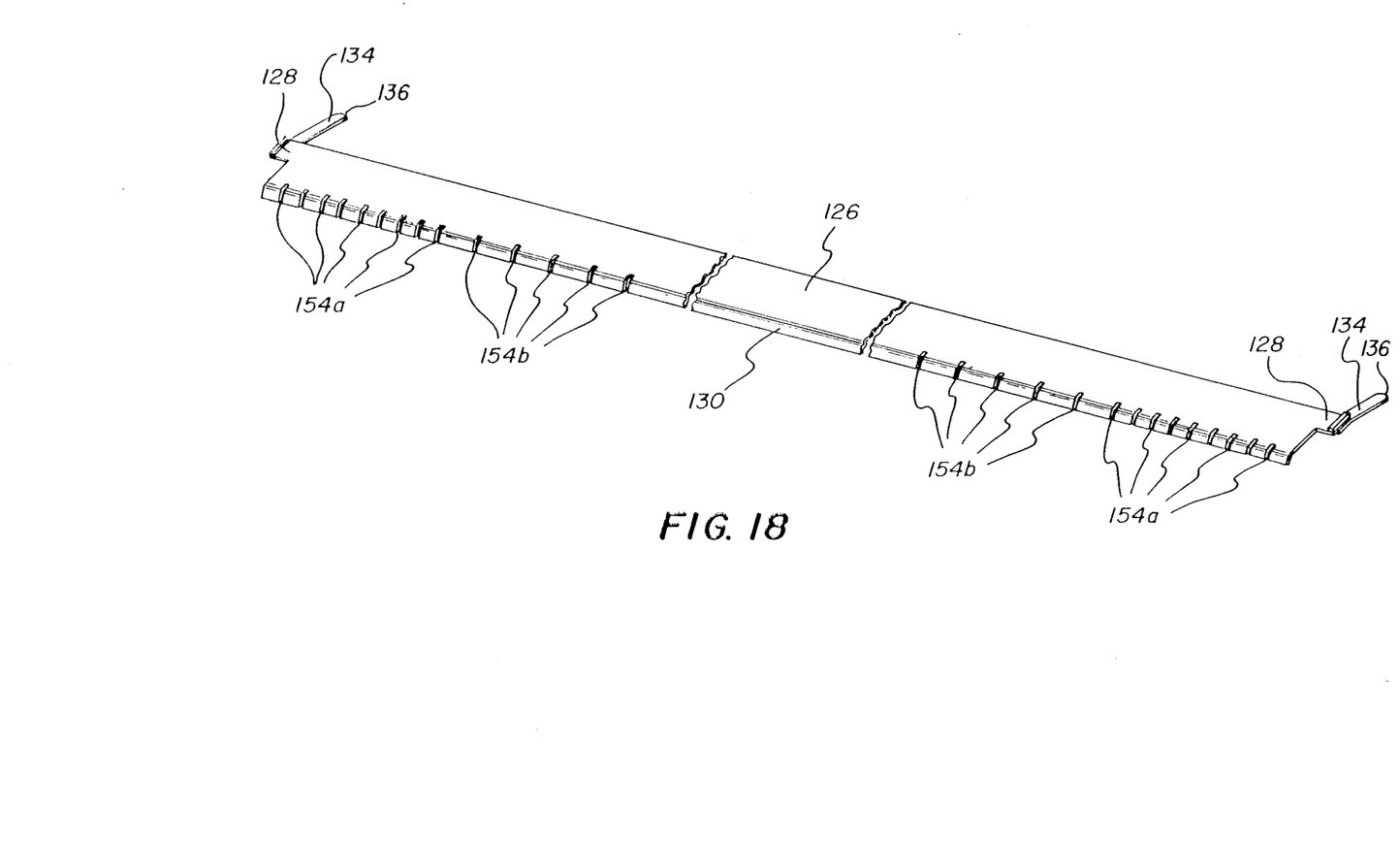
FIG. 18 is a perspective view of a light shield member in accordance with the invention.

Referring to FIG. 18, in accordance with the invention, the light shield 126 (shown without cape 144) is provided with a plurality of spaced notches or cutouts 154 in lip 130 to increase the flexibility of the shield progressively toward its edges. To insure retention of light integrity, the notches may be covered with a flexible material such as black tape. In one embodiment, wherein the shield has a length of approximately 36.2 cm. (14.25 inches) excellent results were obtained by providing in each end portion a group of nine notches 154a spaced by 0.64 cm. (0.25 inches) and a group of five notches 154b spaced by 1.27 cm (0.5 inches). Each of the notches had a width of approximately 0.157 cm. (.062 inches). With this structure, the end portions of the light shield provided adequate light seal during the application of abnormal forces which would normally bow the shield 126 and cause light leakage.

Figure 19:
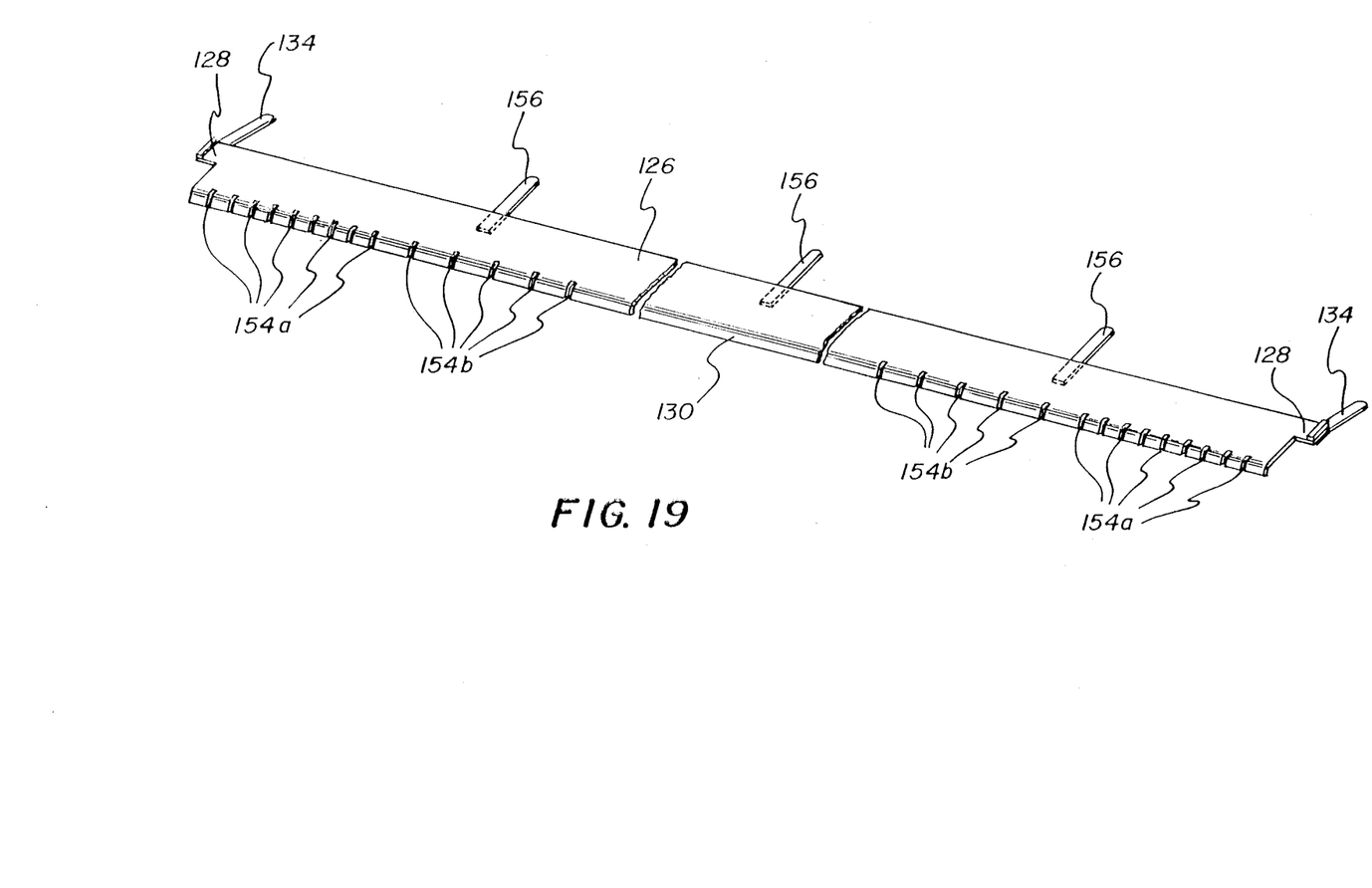
FIG. 19 is a perspective view showing another embodiment of the light shield member shown in FIG. 18.

Referring to FIG. 19, a plurality of support tabs 156 may be attached to the underside of the light shield 126 to provide support to the center portion when it might tend to sag because of its length.

The invention has been described in detail with particular reference to a preferred embodiment thereof, but it will be understood that variations and modifications can be effected within the spirit and scope of the invention.

We claim:

1. In an x-ray cassette having one end wall with a slot through which a sheet of film is moveable therethrough along an inlet path, and an elongate flexible light shield for the slot, the improvement comprising a plurality of spaced notches in end portions of the light shield to increase the flexibility of the end portions of the shield relative to its center portion to prevent light leakage when the center portion of the shield is subjected to forces tending to cause bowing of the shield, said light shield having a lip along an edge thereof and the notches being spaced along the lip, and the spaced notches in each end portion of said shield including an outermost group of notches having a spacing with a predetermined pitch and an innermost group of notches having a spacing with a higher pitch.

* * * * *